(12) United States Patent
Pfeffer et al.

(10) Patent No.: US 9,727,277 B2
(45) Date of Patent: Aug. 8, 2017

(54) STORAGE DEVICE AND METHOD FOR ENABLING HIDDEN FUNCTIONALITY

(71) Applicants: Daniel Moshe Pfeffer, Modi'in (IL); Eyal Sobol, Givat Shmuel (IL)

(72) Inventors: Daniel Moshe Pfeffer, Modi'in (IL); Eyal Sobol, Givat Shmuel (IL)

(73) Assignee: SanDisk Technologies LLC, Plano, TX (US)

( * ) Notice: Subject to any disclaimer, the term of this patent is extended or adjusted under 35 U.S.C. 154(b) by 164 days.

(21) Appl. No.: 13/735,744

(22) Filed: Jan. 7, 2013

(65) Prior Publication Data

US 2014/0181433 A1   Jun. 26, 2014

Related U.S. Application Data

(60) Provisional application No. 61/745,209, filed on Dec. 21, 2012.

(51) Int. Cl.
  *G06F 12/00* (2006.01)
  *G06F 3/06* (2006.01)
  *G06F 12/14* (2006.01)

(52) U.S. Cl.
  CPC .......... *G06F 3/0659* (2013.01); *G06F 3/0622* (2013.01); *G06F 3/0673* (2013.01); *G06F 12/1416* (2013.01)

(58) Field of Classification Search
  USPC .......................................... 711/154
  See application file for complete search history.

(56) References Cited

U.S. PATENT DOCUMENTS

| 7,007,131 | B2 * | 2/2006 | Kendall | G11C 29/46 365/185.01 |
| 7,302,560 | B2 | 11/2007 | Jordan et al. | |
| 7,500,024 | B2 | 3/2009 | Peri et al. | |
| 7,953,913 | B2 | 5/2011 | Perry et al. | |
| 7,953,931 | B2 | 5/2011 | Yu et al. | |
| 2007/0168668 | A1 * | 7/2007 | Chang | G06F 21/572 713/176 |
| 2008/0288819 | A1 * | 11/2008 | Heller, Jr. | 714/19 |
| 2011/0276757 | A1 | 11/2011 | Jindo et al. | |

* cited by examiner

*Primary Examiner* — Matthew Bradley
(74) *Attorney, Agent, or Firm* — Brinks Gilson & Lione

(57) ABSTRACT

A storage device and method for enabling hidden functionality are provided. In one embodiment, a storage device is provided comprising an interface a memory, and a controller. The controller is configured to receive a series of read and/or write commands to the memory from the host device. If the series of read and/or write commands received from the host device matches an expected pattern of read and/or write commands, irrespective what data is being read or written by those commands, the controller enables a special functionality mode of the storage device. Other embodiments are possible, and each of the embodiments can be used alone or together in combination.

21 Claims, 5 Drawing Sheets

STORAGE DEVICE AND METHOD FOR ENABLING HIDDEN FUNCTIONALITY

CROSS-REFERENCE TO RELATED APPLICATION

This application claims the benefit of U.S. Provisional Application No. 61/745,209, filed Dec. 21, 2012, which is hereby incorporated by reference.

BACKGROUND

Communication between a host device and a storage device is typically controlled by the host device's operating system using standard protocols, which include read and write commands. As part of the storage device's functionality, some storage device manufacturers provide a set of vendor-specific management tools to enable the performance of tasks, such as diagnostics and firmware upgrades, without reference to the protocol used to connect the storage device and the host device. One way to enable this "hidden" functionality in a host-device-operating-system-independent way is to write a sector containing a specific 64-byte header to the storage device, which tells the storage device that the next few reads/writes will be part of the vendor-specific management command.

OVERVIEW

Embodiments of the present invention are defined by the claims, and nothing in this section should be taken as a limitation on those claims.

By way of introduction, the below embodiments relate to a storage device and method for enabling hidden functionality. In one embodiment, a storage device is provided comprising an interface, a memory, and a controller. The controller is configured to receive a series of read and/or write commands to the memory from the host device. If the series of read and/or write commands received from the host device matches an expected pattern of read and/or write commands, irrespective what data is being read or written by those commands, the controller enables a special functionality mode of the storage device. Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the following embodiments disclose a storage device and method for enabling hidden functionality. As discussed above, to enable "hidden" functionality of a storage device (e.g., for diagnostics or firmware upgrades) in a host-device-operating-system-independent way, the host device can write a sector containing a specific 64-byte header to the storage device, which tells the storage device that the next few reads/writes will be part of the vendor-specific management command. However, the problem with this approach is that every write operation to the storage device must be examined in order to verify that it has the characteristics of the vendor-specific command. This has a serious impact on the write performance of the storage device.

The following embodiments provide a solution to this problem by comparing a series of read and/or write commands from the host device to an expected pattern of read and/or write commands. If the series of read and/or write commands from the host device matches the expected pattern of read and/or write commands, the storage device enters a special ("hidden") functionality mode. Because it the pattern of the read and/or write commands—and not the data being read and/or written by the command—that enables the hidden functionality, the data in the commands does not need to be examined, as in the prior approach discussed above. This results in a much faster analysis with a far less serious impact on the performance of the storage device.

Before turning to these and other embodiments, the following section describes exemplary host and storage devices. It should be noted that these exemplary host and storage devices are merely examples and that other architectures can be used.

Exemplary Host and Storage Devices

Figure 1:
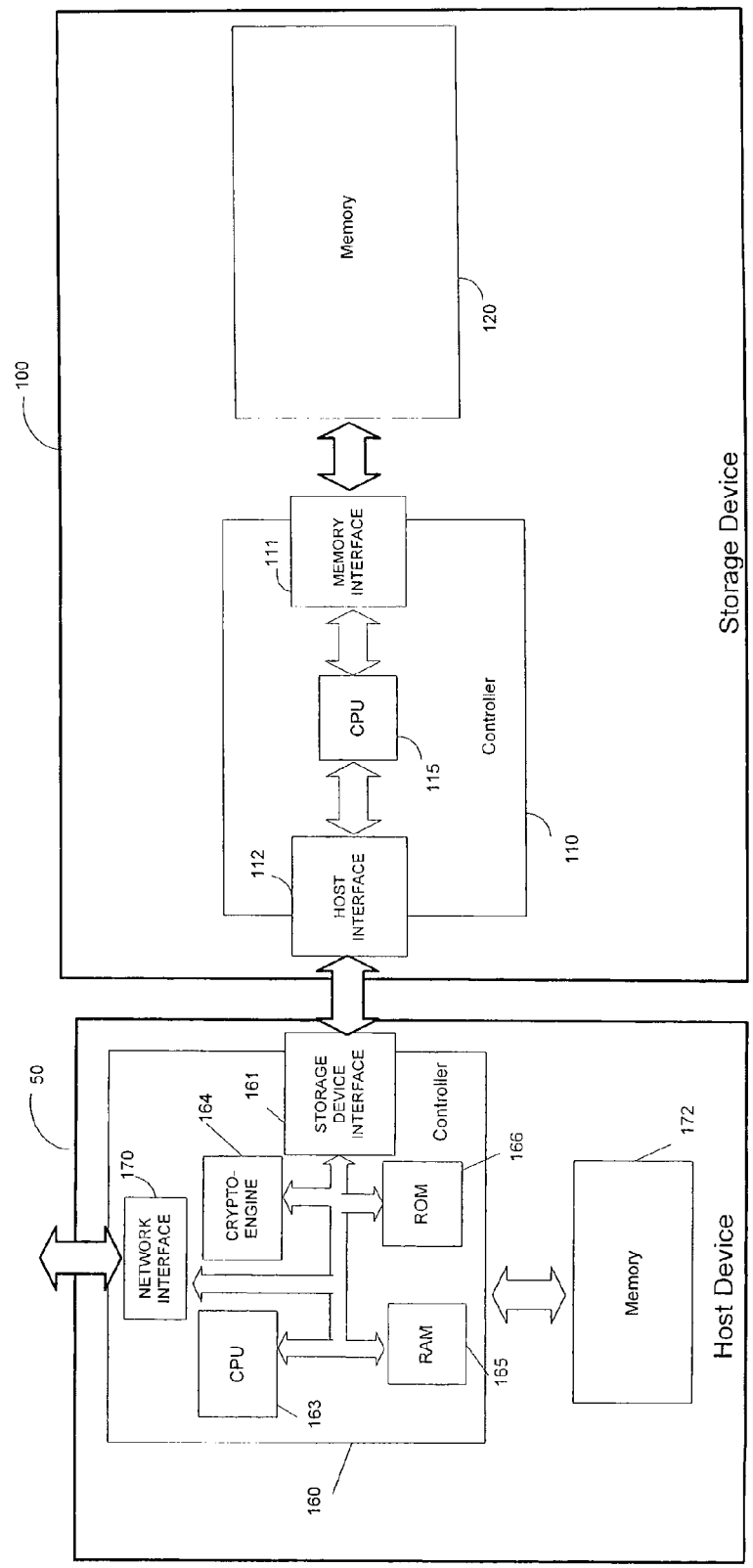
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors (interfaces) that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. In this embodiment, the storage device 100 is a mass storage device that can take any suitable form, such as, but not limited to, a handheld, removable memory card (such as a Secure Digital (SD) card or a MultiMedia Card (MMC)), a universal serial bus (USB) device, and a removable or non-removable hard drive (e.g., magnetic disk or solid-state drive). Alternatively, the storage device 100 can take the form of an embedded memory (e.g., a secure module embedded in the host device 50), such as an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 115. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. In one embodiment, the memory 120 comprises a public memory area that is managed by a file system on the host device 50, a private memory area that is internally managed by the controller 110, and a system memory area that is also internally managed by the controller 110. Other configurations are possible. For example, in another embodiment, the memory can contain a public memory area and a private memory area but not a system memory area, or a public memory area and system memory area but not a private memory area.

Without intending to be a limitation, the storage device 100 can be a TrustedFlash™ device from SanDisk Corporation. TrustedFlash™ technology protects the content encryption key using access control, and, as such, the content encryption key cannot be freely copied. By storing the CEK on the storage device 100, purchased content can become portable and used on a wide variety of authorized devices. A TrustedFlash™ storage device also has an accounting system, in which a user can attempt to authenticate to a playback account on the storage device, which associates specific users with various permissions and rights to stored CEKs. So, once a user has successfully authenticated to a playback account, the user can use the stored CEK, as specified by the account's permissions, to decrypt and access content that was encrypted with that CEK. The storage device 100 can also be provided with a security system that enables the revocation of a CEK when there is a compromised host device.

Turning now to the host device 50, the host device 50 comprises a controller 160 that has a storage device interface 161 for interfacing with the storage device 100 and an optional network interface 170 for interfacing with a network. The network interface 170 can use any suitable technology, such as, but not limited to, a wireless transceiver for wirelessly communicating with the network or a wired connection for a network connector, such as an Ethernet cable. The controller 160 also comprises a central processing unit (CPU) 163, a crypto-engine 164 operative to provide encryption and/or decryption operations, read access memory (RAM) 165, and read only memory (ROM) 166. The storage device 100 also contains a memory 172 for storing, for example, applications (apps) and programs (e.g., a browser, a media player, etc.) used in the operation of the host device 50. The host device 50 can contain other components (e.g., a display device, a speaker, a headphone jack, a video output connection, etc.), which are not shown in FIG. 1 to simplify the drawings. Also, other implementations of the host device 50 are possible. For example, instead of containing a hardware crypto-engine, the CPU 163 of the host device 50 may be able to perform cryptographic operations in software at a desirable speed.

In general, the host device 50 is operable to render content stored in the storage device 100. As used herein, "content" can take any suitable form, including, but not limited to, a song, a movie, a game, an application ("app"), a game installer, etc. Depending on the type of content, "render" can mean playing (e.g., when the content is a song or movie), deciphering (e.g., when the content is a game installer), or whatever action is needed to "enjoy" the content. In some embodiments, the host device 50 contains the necessary software to render the content (e.g., a media player), whereas, in other embodiments, such software is provided to the host device 50 by the memory device 100 or another entity. Also, the content file can contain not only the content itself but also metadata with a network location to an application that can render the content or other information needed to render the content.

With the exemplary host and storage devices now explained, the following sections provides a discussion of embodiments related to enabling hidden functionality on a storage device.

Embodiments Related to Enabling Hidden Functionality on a Storage Device

As discussed above, to enable "hidden" functionality of a storage device (e.g., for diagnostics or firmware upgrades) in a host-device-operating-system-independent way, the host device can write a sector containing a specific 64-byte header to the storage device, which tells the storage device that the next few reads/writes will be part of the vendor-specific management command. However, writing a special pattern to the storage device at an arbitrary location involves an unacceptable overhead because every write operation to the storage device must be examined in order to verify that it has the characteristics of the vendor-specific command. This has a serious impact on the write performance of the storage device.

The following embodiments provide a solution to this problem by comparing a series of read and/or write commands from the host device to an expected pattern of read and/or write commands. If the series of read and/or write commands from the host device matches the expected pattern of read and/or write commands, the storage device enters a special ("hidden") functionality mode. Because it is the pattern of the read and/or write commands—and not the data being read and/or written by those commands—that enables the hidden functionality, the data in the commands does not need to be examined. This results in a much faster analysis with a far less serious impact on the performance of the storage device, as compared to the prior approach discussed above.

It should be noted that these embodiments can be implemented in any suitable manner. The following are several examples of possible implementations, which can be performed by the controller 110 of the storage device 100 executing firmware or other computer-readable program code stored in the storage device 100 (e.g., in the memory 120 or RAM or ROM). Alternatively, these implementations can be performed by hardware only. The following paragraphs discuss flow charts of possible routines that can be executed by the controller 110. Of course, other implementations are possible, and details of these implementations should not be read into the claims and expressly recited therein.

In these implementations, after a hardware reset, the storage device starts up with the hidden functionality disabled. Also, it is assumed that the application on the host device 50 will attempt to perform the enabling pattern as fast as possible, in order to avoid interference with other applications performing I/O to the storage device 50. Also, it is preferred that the I/O pattern detection be disabled once the hidden functionality has been enabled. It is also preferred that a new command be added that disables the hidden functionality, as some operating systems (e.g., Windows 8) performs a hardware reset only on very rare occasions. Therefore, relying on a hardware reset to disable the hidden functionality may not be a preferred solution in those environments.

Figure 2:
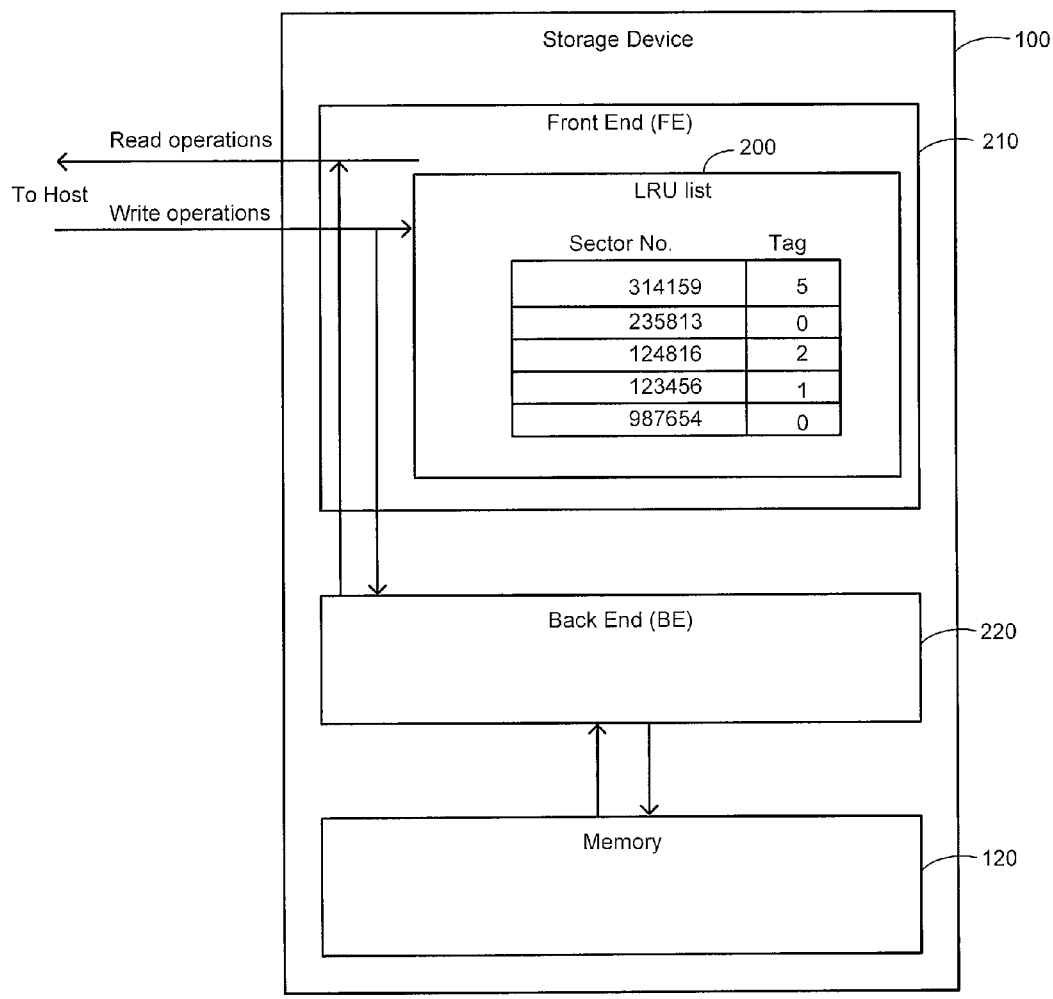
FIG. 2 is a block diagram of an exemplary storage device of an embodiment.

In these implementations, a least recently used (LRU) list 200 is used to determine if a series of read and/or write commands received from the host device matches an expected pattern of read and/or write commands to enable the special functionality mode. As shown in FIG. 2, a LRU list 200 can be located in the front end 210 of the storage device's firmware (which can be executed by the storage device's controller 110). The front end 210 is the interface between the host device 50 and the storage device 100. The front end 210 communications with the back end 220, which is the interface to the memory 120. As also shown in FIG. 2, the LRU list 200 keeps track of sector numbers (the LRU list can be a relatively short (e.g., 100 entries)) and a tag, whose purpose will be discussed below.

In one possible implementation, the entire storage device 100 is available for read access (e.g., for a Windows XP administrator). In this implementation, an application on the host device 50 wishing to enable the hidden functionality would lock the storage device 100 for exclusive access and read a specific set of logical block addresses (e.g., reading from LBAs 0, 1, 2, 3, 5, 8, 13, 21, 34, 55, . . . ). The last read in the sequence would return a signature that would indicate that the hidden functionality had been enabled. This implementation may be preferred in environments that allow device-level I/O to lock the storage device 100 for exclusive access (e.g., Windows XP (as an administrator)).

Figure 3:
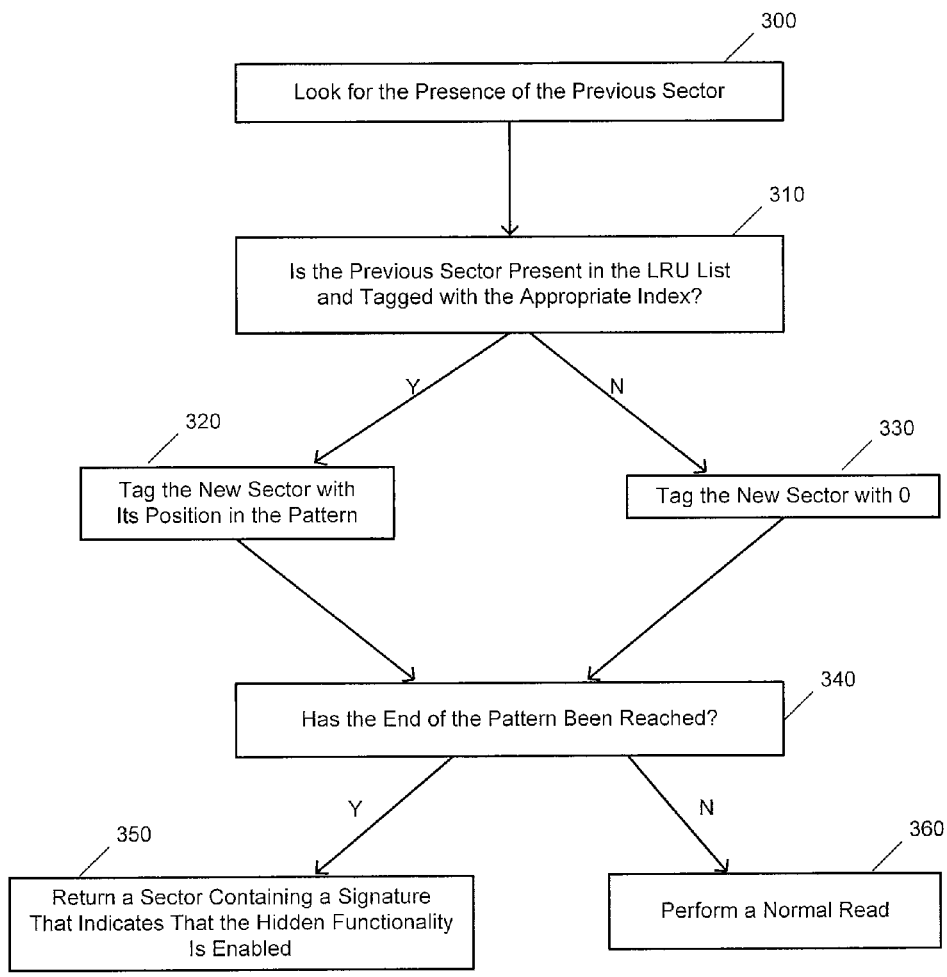
FIG. 3 is a flow chart of a method of an embodiment.
Figure 4:
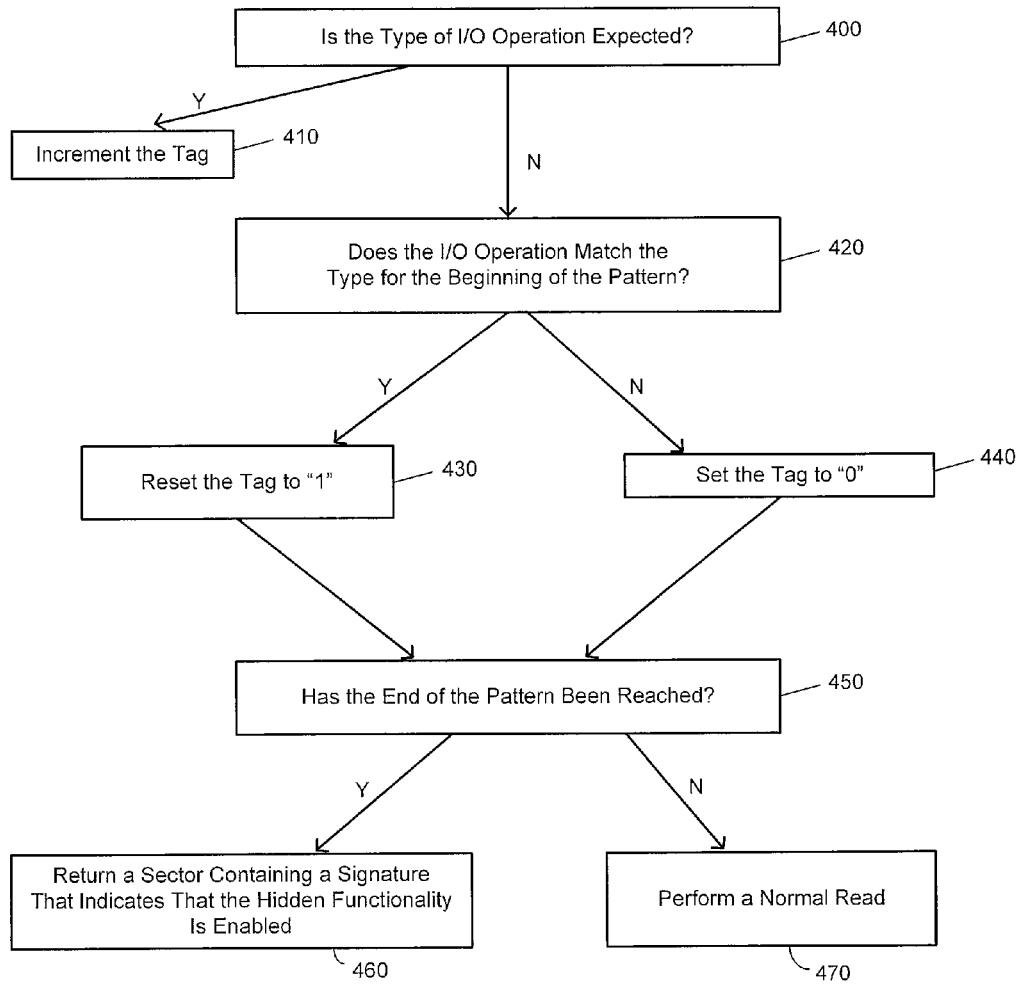
FIG. 4 is a flow chart of another method of an embodiment.
Figure 5:
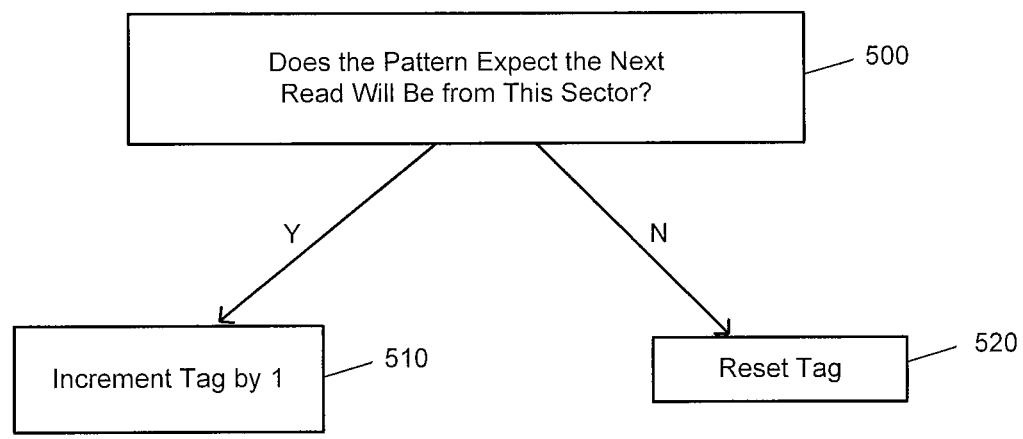
FIG. 5 is a flow chart of another method of an embodiment.

In this implementation, the LRU list 200 stores the first sector of any read operation. Each sector in the LRU list 200 has a tag indicating its position in the pattern—0 if it is not part of the pattern, 1 if it is the $1_{st}$ sector of the pattern, etc. As shown in the flow chart in FIG. 3, if a sector is read that may be part of the pattern, the controller 110 looks for the presence of the previous sector (act 300). For example, given the pattern 0, 1, 2, 3, 5, 8, if sector 5 is read, the controller 110 looks for the presence in the LRU list 200 of sector 3. The controller 110 then determines if the previous sector is present in the LRU list 200 and if it is tagged with the appropriate index (act 310). If it is, the controller 210 tags the new sector with its position in the pattern (act 320). Otherwise, the controller 210 tags the new sector with 0 (act 330). For example, if sector 3 is tagged with the value "4", it is part of the pattern, and sector 5 should be tagged with the value "5". Otherwise, sector 3 is not part of the pattern and sector 5 should be tagged with the value "0". The controller 110 then determines if the end of the pattern has been reached (act 340). If the end of the pattern has been reached, the storage device 100 returns a sector containing a signature that indicates that the hidden functionality is enabled (act 350). Otherwise, a normal read is performed (act 360).

In another possible implementation, an arbitrary sector is available for read/write access, which would be the case in almost any operating system. In this implementation, an application on the host device 50 wishing to enable the hidden functionality would create a file, extend it to the size of at least one sector (e.g., 512 bytes) filled with zeros, and perform a specific pattern of read/write operations on the sector (e.g., 1 read, 2 writes, 3 reads, 5 writes, 8 reads, . . . ). The last element of the pattern preferably is a read operation, which would return a signature indicating that the hidden functionality had been enabled. This implementation has the advantage that only single sectors need be monitored for the specific I/O pattern. However, in this implementation, both read and write operations are be monitored in order to determine whether the operation pattern has been detected, which can add overhead.

In this implementation, the LRU list 200 for the first sector of any I/O operation is used. Each sector in the LRU list 200 has a tag indicating its position in the pattern—0 if it does not match the pattern, 1 if it is the first I/O operation in the pattern, etc. When an I/O operation is performed to a sector that does not exist in the LRU list 200, it is entered in the LRU list 200 only if the type of I/O matches the first element of the pattern. For example, for a pattern of 1 write, 2 reads, 3 writes, 5 reads, the new sector is entered in the LRU list 200 only if the I/O operation was a write. In that case, the new sector would be tagged with "1". When an I/O operation is performed to a sector that exists in the LRU list 200, the controller 110 checks whether the type of the I/O operation is what is expected for the pattern (act 400). If the type of I/O operation is what is expected, the controller 110 increments the tag (act 410). If the type of I/O operation is not what is expected but matches the type for the beginning of the pattern (act 420), the controller 110 reset the tag to "1" (act 430). Otherwise, the controller 110 sets the tag to "0" (act 440). The controller 110 then determines if the end of the pattern has been reached (the tag equals the number of operations in the pattern) (act 450). If it has, the controller 110 returns a sector containing a signature that indicates that the hidden functionality is enabled (act 460). Otherwise, a normal read is performed (act 470).

In yet another possible implementation, an arbitrary adjacent pair of sectors are available for read access, which would be true in almost any operating system. In this implementation, an application on the host device 50 wishing to enable the hidden functionality would create a file, extend it to the size of at least two sectors (e.g., 1,024 bytes) filled with zeros, and perform a specific pattern of alternating read operations on the two adjacent sectors (e.g., 1 read from the first sector, 2 reads from the second sector, 3 reads from the fist sector, . . . ). The last read operation of the pattern would return a signature indicating that the hidden functionality had been enabled. This implementation has the advantage that only read operations need be monitored for the operation pattern. However, in this implementation, adjacent pairs of sectors need be monitored for the operation pattern. Also, while there is no guarantee that sectors in a file are contiguous, this is not a problem with file systems that allocate storage in blocks of at least two sectors (e.g., 1,024 bytes).

In this implementation, the LRU list 200 is used for the first sector of any sequence of adjacent sectors. Here, each sector in the LRU list 200 has a tag indicating the position in the pattern—0 if it does not match the pattern, 1 if it is the first I/O operation in the pattern, etc. When a read operation is performed from a sector that exists in the LRU list 200, the controller 110 checks whether the pattern expects that the next read will be from this sector (as opposed to the following sector) (act 500). If the expected read is from this sector, the tag is incremented by 1 (act 510). Otherwise, the tag is reset to "1" (act 520).

If a read operation is performed from a sector that does not exist in the LRU list 200, the controller 110 checks whether the previous sector exists in the LRU list 200. If the previous sector does exist in the LRU list 200, the controller 110 checks whether the pattern expects that the next read will be from the current sector. If the expected read is from the current sector, the tag for the previous sector is incremented. Otherwise, the tag for the previous sector is set to "0", and the current sector is added to the LRU with a tag of "1". If the read operation is performed from a sector that does not exist in the LRU list 200 and its previous sector does not exist in the LRU list 200, it is added to the LRU list with a tag of "1".

The controller 110 then determines if the end of the pattern has been reached (the tag equals the number of operations in the pattern). If the end of the pattern has been reached, the controller 110 returns a sector containing a signature that indicates that the hidden functionality is enabled. Otherwise, the controller 110 performs a normal read.

As mentioned above, these implementations are merely examples, and other implementations can be used.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage device comprising:
an interface through which the storage device can connect to and communicate with a host device;
a memory; and
a controller in communication with the interface and the memory, wherein the controller is configured to:
receive a series of read and/or write commands to the memory from the host device; and
in response to the series of read and/or write commands received from the host device matching a pattern of read and/or write commands to specific logical block addresses enable a special functionality mode of the storage device, wherein it is the pattern of read and/or write commands to specific logical block addresses and not data being read and/or written by the read and/or write commands that enables the special functionality mode of the storage device.

2. The storage device of claim 1, wherein the controller is further configured to use a least recently used (LRU) list to determine if the series of read and/or write commands received from the host device matches the pattern of read and/or write commands.

3. The storage device of claim 1, wherein the pattern of read and/or write commands comprises read commands to a set of logical block addresses in any part of the memory.

4. The storage device of claim 1, wherein the pattern of read and/or write commands comprises a pattern of read and write commands to a single sector of the memory.

5. The storage device of claim 1, wherein the pattern of read and/or write commands comprises a pattern of read commands alternate between two adjacent sectors of the memory.

6. The storage device of claim 1, wherein a last command in the series of read and/or write commands received from the host device is a read command, which returns a signature indicating that the special functionality mode of the storage device has been enabled.

7. The storage device of claim 1, wherein the controller is further configured to lock the storage device for exclusive access prior to receiving the series of read and/or write commands from the host device.

8. The storage device of claim 1, wherein the controller is further configured exit the special functionality mode in response to a command received from the host device.

9. The storage device of claim 1, wherein the controller is further configured to start up with the special functionality mode disabled upon a hardware reset.

10. The storage device of claim 1, wherein the special functionality mode is used for one or more of the following: storage device diagnostics and storage device firmware upgrade.

11. A method for enabling hidden functionality, the method comprising:
performing the following in a storage device:
receiving a series of read and/or write commands to the memory from the host device; and
in response to the series of read and/or write commands received from the host device matching a pattern of read and/or write commands to specific logical block addresses, enabling a special functionality mode of the storage device, wherein it is the pattern of read and/or write commands to specific logical block addresses and not data being read and/or written by the read and/or write commands that enables the special functionality mode of the storage device.

12. The method of claim 11 further comprising using a least recently used (LRU) list to determine if the series of read and/or write commands received from the host device matches the pattern of read and/or write commands.

13. The method of claim 11, wherein the pattern of read and/or write commands comprises read commands to a set of logical block addresses in any part of the memory.

14. The method of claim 11, wherein the pattern of read and/or write commands comprises a pattern of read and write commands to a single sector of the memory.

15. The method of claim 11, wherein the pattern of read and/or write commands comprises a pattern of read commands alternate between two adjacent sectors of the memory.

16. The method of claim 11, wherein a last one command in the series of read and/or write commands received from the host device is a read command, which returns a signature indicating that the special functionality mode of the storage device has been enabled.

17. The method of claim 11 further comprising locking the storage device for exclusive access prior to receiving the series of read and/or write commands from the host device.

18. The method of claim 11 further comprising exiting the special functionality mode in response to a command received from the host device.

19. The method of claim 11 further comprising starting up with the special functionality mode disabled upon a hardware reset.

20. The method of claim 11, wherein the special functionality mode is used for one or more of the following: storage device diagnostics and storage device firmware upgrade.

21. A storage device comprising:
a memory;
means for receiving a series of read and/or write commands from a host device; and
means for, in response to the series of read and/or write commands received from the host device matching a pattern of read and/or write commands to specific logical block addresses, enabling a special functionality mode of the storage device, wherein it is the pattern of read and/or write commands to specific logical block addresses and not data being read and/or written by the read and/or write commands that enables the special functionality mode of the storage device.

* * * * *